(12) United States Patent
Zeng et al.

(10) Patent No.: US 7,873,169 B2
(45) Date of Patent: Jan. 18, 2011

(54) METHODS, DEVICES AND SYSTEMS FOR GENERATING ANONYMOUS PUBLIC KEYS IN A SECURE COMMUNICATION SYSTEM

(75) Inventors: Ke Zeng, Beijing (CN); Tomoyuki Fujita, Yokohama (JP)

(73) Assignee: NEC (China) Co., Ltd., Beijing (CN)

( * ) Notice: Subject to any disclaimer, the term of this patent is extended or adjusted under 35 U.S.C. 154(b) by 1470 days.

(21) Appl. No.: 11/269,774

(22) Filed: Nov. 9, 2005

(65) Prior Publication Data

US 2006/0098819 A1 May 11, 2006

(30) Foreign Application Priority Data

Nov. 10, 2004 (CN) .................. 2004 1 0090903

(51) Int. Cl.
*H04L 9/08* (2006.01)
(52) U.S. Cl. .......................... 380/283; 380/44
(58) Field of Classification Search ............. 380/44–47, 380/30, 277–286
See application file for complete search history.

(56) References Cited

U.S. PATENT DOCUMENTS 5,901,229 A * 5/1999 Fujisaki et al. ............. 380/30
7,434,046 B1 * 10/2008 Srivastava .................. 713/163

FOREIGN PATENT DOCUMENTS

CN 1258051 A 6/2000

OTHER PUBLICATIONS

Bruce Schneier, "Applied Cryptography Second Edition: Protocols, Algorithms, and Source code in C", 1996, Katherine Schowalter, Second Edition, pp. 476-479.*

Jan Camenisch, Markus Michels, "A Group Signature Scheme with Improved Efficiency", 2000, K.Ohta and D. Pei (Eds.): ASIACRYPT'98, INCS 1514, pp. 160-174.*

Jan Leonhard Camenisch, "Group Signature Schemes and Payment Systems Based on the Discrete Logarithm Problem", 1998, A dissertaion submitted to the Swiss Federal Institute of Technology Zurich for the degree of Doctor of Technical Sciences, Diss. ETH No. 12520.*

Zhang, N. Shi, Q. Merabti, M.; Anonymous public-key certificates for anonymous and fair documentexchange; Publication Date: Dec. 2000; vol. 147, Issue: 6; On pp. 345-350.*

A Blind Signature Scheme Based on Elgamal Signature, Feb. 22-24, 2000, Seventeenth National Radio Science Conference.*

(Continued)

*Primary Examiner*—Matthew B Smithers
*Assistant Examiner*—Jing Sims
(74) *Attorney, Agent, or Firm*—Sughrue Mion, PLLC

(57) ABSTRACT

Methods, devices and systems for generating a plurality of public keys from one private key with the same generator of a group are described. A public key cryptosystem is also disclosed for generating a plurality of anonymous public keys all of which relate to the same party used for secure communications. Those anonymous public keys are generated using the same generator from one single private key. With the invention, computation is reduced, memory can be saved and security level can be improved.

23 Claims, 4 Drawing Sheets

OTHER PUBLICATIONS

B. R. Waters, E. W. Felten, A. Sahai; "Receiver Anonymity via Incomparable Public Keys"; CCS'03, Oct. 27-30, 2003; Washington DC, USA; pp. 112-121.

A. J. Menezes, P. C. van Oorschot; S. A. Vanstone; "Handbook of Applied Cryptography"; CRC Press LLC, 1997; Boca Raton FL, USA.

A Master Thesis of K. Oishi at the University of California Santa Barbara; "Unconditionally Anonymous Public-key Certificates and their Applications"; Aug. 1999.

Lidong Chen, "Access with Pseudonyms", Lecture Notes in Computer Science; Proceedings of the International Conference on Cryptography: Policy and Algorithms, Dec. 31, 1995, pp. 232-243, vol. 1029, Springer-Verlag, London, UK.

L. Chen; "Access with Pseudonyms"; Cryptography: Policy and Algorithms; International Conference; Jul. 3, 1995; pp. 232-243.

* cited by examiner

METHODS, DEVICES AND SYSTEMS FOR GENERATING ANONYMOUS PUBLIC KEYS IN A SECURE COMMUNICATION SYSTEM

FIELD OF THE INVENTION

This invention relates to computer communication network security, and more particularly to public key cryptographic communication systems and methods.

BACKGROUND

With the proliferation of computer communication networks, such as IP network, telecommunication network, mobile ad-hoc network, and personal area network, many applications have been developed and deployed over said computer communication networks. These applications include healthcare system, e-prescription system, e-mail system, e-shopping system, e-auction system, multimedia system, pay-TV system, location based service system, and ubiquitous computing system etc. However, information, or more generically data, transferred through these systems is subject to hacking, snooping, eavesdropping, tampering, and manipulation and so on. While the degree of concern for security and privacy may vary from application to application and notably from person to person, it's a general requirement that digital information be securely delivered from the sender to the receiver, and that neither a third-party nor the receiver can jeopardize the information's security. In addition, it is required that the privacy of the sender, as well as the receiver, be preserved to a satisfactory extent.

An example for protecting the information's security is the secure e-mail system. In this case, only the sender and the receiver can interpret the e-mail. Another example is the secure electronic payment system, where only the owner of an account can spend the funds in the account.

Information privacy issues in many cases demand equal, if not heightened, awareness as information security issues. Consider the aforementioned secure e-mail and secure electronic payment systems, wherein the participants of e-mail and electronic payment systems expect that nobody else other than the participants knows the existence of communication. To protect the sender's privacy in an email, it may be necessary in some cases that even the receiver cannot tell who the sender is. For an electronic payment transaction, it may sometimes be preferable that the payee cannot identify the payer. There are many other examples for information privacy. When utilizing location based services, the location of the owner who carries a mobile device is in most cases under full control of the owner. In e-shopping, the payer may want to inhibit the online merchants from correlating her purchasing history, and then deducing her personal interest. In e-auction, the bidder may want to prevent competitors from analyzing her bidding strategy, and then using such knowledge to defeat her. Other examples include anonymous membership management and anonymous voter for e-voting etc.

In general, cryptographic communication systems are adapted to transfer a message between remote locations. Such systems include at least one encoding device at a first location and at least one decoding device at a second location, with the encoding and decoding devices both being coupled to computer communication networks. For digital systems, the message is defined to be a digital message, that is, a sequence of symbols from some alphabet. In practice, the alphabet is generally chosen to be the binary alphabet consisting of the symbols 0 and 1. In a typical communication session, each user's terminal is often equipped with both an encoder and a decoder so that the user can transmit and receive encrypted information to and from another user.

Conventionally, a number of public key cryptographic encoding and decoding techniques are readily available to provide some degree of security as well as privacy. For example, U.S. Pat. No. 4,405,829, issued to Rivest, et al., and El Gamal (Tahir ElGamal. *A public-key cryptosystem and a signature scheme based on discrete logarithms*. Advances in Cryptology Proceedings of CRYPTO 84, pages 10-18, 1985) are technologies well recognized in the field. The teaching of the Rivest patent and El Gamal is incorporated by reference.

In a public key cryptosystem, each user (e.g. user A) places in a public file an enciphering operator or public key, $E_A$. User A keeps to himself the details of the corresponding deciphering operator or private key $D_A$ which satisfies the equation $$D_A(E_A(M))=M,$$

for any message M. In order for the public key system to be practical, both $E_A$ and $D_A$ must be efficiently computable. However, user A must not compromise $D_A$ when revealing $E_A$. That is, it should not be computationally feasible for an adversary to find an efficient way of computing $D_A$, given only the enciphering key $E_A$ and probably some sorts of plain text-cipher text pairs. In a public key system, a judicious selection of keys ensures that only user A is able to compute $D_A$ efficiently.

Whenever another user (e.g. user B) wishes to send a message M to user A, he looks up $E_A$ in the public file and then sends the enciphered message $E_A(M)$ to user A. Upon receipt, user A deciphers the message by computing $$D_A(E_A(M))=M.$$

Since $D_A$ is not derivable from $E_A$ in a practical way, only user A can decipher the message $E_A(M)$ sent to him. Similarly, if user A wants to send a message in response to user B, user A enciphers the response message using user B's encryption key $E_B$, also available in the public file. Said procedure of secure communication implies that each user who wishes to receive private communication must place his enciphering key E in the public file. Or in other words, to securely communicate with other parties, with traditional public key cryptosystem such as RSA and El Gamal, user A is required to disclose his/her public key to outer world. However, in most cases, user A only possesses one public/private key pairs, i.e. one public key and its corresponding unique private key. This typical kind usage of public key cryptosystem has the unintentional consequence of making user A's public key properly serve as his/her identity. It means that even if a privacy concerned user is protected by such kinds of public key cryptosystem as well as other well designed privacy protection measures, an adversary is still capable of correlating activities of the user being protected through collecting and observing information released by the user based on the pattern of usage of the unique public key.

In the information age, privacy is broadly recognized as a dominant concern of information exchange. Privacy surveys show consistently that 80 to 90 percent of all people are concerned about privacy, and that 25 percent are willing to pay a considerable price in money or inconvenience for it. Such privacy protection significance not only exposes the shortcoming of the existing public key cryptosystem, but also emphasizes the importance and urgency of a new and improved anonymous public key methodology.

Within traditional public key cryptosystems, such as those disclosed by RSA and El Gamal, if user A is concerned that his/her single public key may violate his/her privacy, it's possible to eliminate the identifiable characteristics of the individual public key. The resort is no more than mandating concerned individual, say user A, to possess several distinct public keys and release each of the public keys to different correspondents with caution.

Besides possessing many public key pairs, Waters et al. have proposed a method making use of El Gamal cryptosystem to realize an Incomparable Public keys Scheme, by which a user can simultaneously possess several public keys while all these public keys correspond to a single private key. See B. R. Waters, E. W. Felten, A. Sahai, *Receiver Anonymity via Incomparable Public keys, CCS'03*, Washington, D.C., USA, pp. 112~121. (hereinafter "Waters"). The teaching of Waters is also incorporated by reference.

By employing multiple public key pairs, conventional public key cryptosystems can mitigate the privacy concern to some extent. However, the concerned individual is still far from being satisfied. In fact, such measure has lots of drawbacks. For one, each distinct public key has a corresponding distinct private key which implies that along with the increasing number of public keys, the managing cost of public-private key pairs for individual increases. For two, each distinct public key has a corresponding distinct private key which implies that along with the increasing number of private keys, the security risk of loss or disclosure of private keys increases. For three, consider a person possessing 100 public key pairs which are definitely quite a lot for a person with traditional public key cryptosystems. Suppose the person intends to communicate with 200 correspondents either in parallel or serial communications. Consequently, at least every 2 out of the correspondents will sense the same public key of the privacy-concerned person, which is definitely considered as unacceptable privacy invasion. Finally, the receiver of a ciphered message may have to try all the private keys to decipher the message, which is very time consuming and inefficient.

Waters' scheme seems to be able to eliminate the managing cost of several public key pairs as well as concomitant security risks. However their Incomparable Public Keys Scheme generates new public keys by utilizing different generators to construct the public key of the El Gamal cryptosystem, which makes computation optimization difficult. For example, (g, $g^a$) and (h, $h^a$) are different public keys generated by Waters' Incomparable Public Keys Scheme, where g and h are different generators. Conventionally, the El Gamal cryptosystem makes use of only one generator hence it can be benefited by calculating the power of generator off-line and maintaining only one table of the power of generator. Waters' scheme requires either maintaining several tables of the power of different generators, or on-line computation, neither of which is very desirable in terms of computation optimization and cost management.

SUMMARY OF THE INVENTION

This invention discloses public key cryptosystems for generating a plurality of anonymous public keys all of which relate to the same party used for secure communications. Furthermore, those anonymous public keys are generated using the same generator from one single private key.

More particularly, the present invention discloses methods and devices for generating a plurality of public keys from a private key x, based on the same generator g, that assumes the form of ($y_1=g^r$, $y_2=y_1^x$), where a new public key is generated when a different r is selected, as in the case of a different communication session, or a different correspondent.

More particularly, this invention is based on the application and implementation of the well-known Group Theory in mathematics. Let G be a finite cyclic group. The decoding key (private key) D is a selected member x of group G. Let g be a generator of group G. Thus, the encoding key (public key) E consists of a pair of group G members, $y_1$ and $y_2$, computed as follows:

$$y_1=g^r$$

$$y_2=(y_1)^x,$$

where r is an integer (hereinafter referred to as the "indicator"). If $y_1$ or $y_2$ is originally outside the range of group G, they must be mapped into group G. The mapping methods may vary for different groups as defined by the selected groups.

Furthermore, when a different r, the indicator, is selected, a new public key is generated.

An encoding device may encrypt a plain text message M as follows:

$$C_1=y_1^k$$

$$C_2=M \odot y_2^k$$

$$C=(C_1, C_2)$$

where k is an integer (hereinafter referred to as the "designator"), $\odot$ is an invertible operation of group G, and $C_1$ and $C_2$ are members of group G.

When receiving the cipher text C from a sender, the decoding device at the receiver's end may transform C to a message word M' (i.e. reconstituted plain text) as follows:

$$t=C_1^{-x}$$

$$M'=t \odot C_2$$

where M' is a member of group G and $\odot$ is the group G invertible operation.

For a message to be encoded that is outside the range of group G, it must be transformed into several group members before encoding. Following subsequent decoding, the recovered group members may be transformed back to the original message. The transformation methods may vary for different groups or for different implementations.

If $C_1$ or $C_2$ is originally outside the range of group G, they must be mapped into group G. The mapping methods may vary for different groups or for different implementation, and they are well known to those skilled in the art.

Through the selection of an indicator r, the user can generate lots of public keys corresponding to a single private key x.

Accordingly, the user needs to maintain only one table for storing the powers of the generator and can compute them off-line, thus avoiding overhead for on-line computation.

In contrast to the secure communication system based on Waters' proposal, this invention discloses a novel anonymous pubic keys technique for a secure communication system. The present invention utilizes powers, i.e. exponentiation, of the generator to construct anonymous public keys, while El Gamal Cryptosystem and Waters' scheme directly use the generator to construct public key.

According to the present invention, there exist at least the following advantages over the conventional techniques:

One, this invention enables privacy-concerned people to disclose his/her public keys to the correspondent in order to set up secure communications where communication histories are significant.

Two, this invention is based on a new technique where multiple public keys correspond to a single private key, hence greatly reducing individual managing cost of public key pairs and lowering the security risk on private key to the max extent.

Three, this invention allows for new optimization techniques that can facilitate adopting proposed anonymous public keys at lower cost and shift computation-intensive tasks to offline or off-peak time of computing system.

Four, this invention can reduce the inevitable computation overhead by effectively and efficiently shifting part of the computation burden to correspondent, without notably introducing additional cost to the correspondent.

Five, this invention allows for a new optimization technique which can efficiently reduce the storage consumption of the public keys.

Six, through anonymizing public keys, this invention naturally guarantees the anonymity of private keys. In contrast, with the conventional public key cryptographic techniques, the private key is inevitably identified by the unique public key, although the exact value of the private key is a secret. This leads to a possible utilization of this invention in some cases, where the user may possess some private keys and generate a series of anonymous public keys for different private keys, respectively. In this sense, the private keys in use are anonymized, or in other words, they are anonymous private keys.

BRIEF DESCRIPTIONS OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Methods, devices and systems for generating anonymous public keys in a secure communication system are disclosed. In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as to avoid unnecessarily obscuring the present invention.

Throughout the specification, the term "group" refers to the mathematics concept defined as follows unless otherwise indicated:

A group (G, $\diamond$) consists of a set G with a binary operation $\diamond$ on G satisfying the following three axioms:
(i) The group operation is associative. That is, a $\diamond$ (b $\diamond$ c)= (a $\diamond$ b) $\diamond$ c for all elements a, b, c of G;
(ii) There is an identity element e of G such that a $\diamond$ e=e $\diamond$ a=a for all elements a of G; and
(iii) For each element a of G there exists an element $a^{-1}$ of G, called the inverse of a, such that a $\diamond$ $a^{-1}$=$a^{-1}$ $\diamond$ a=e.

For example, the set of integers Z with operation of addition forms a group. The identity element is 0 and the inverse of an integer a is the integer −a. For more information, please refer to *Handbook of Applied Cryptography*, available online at http://www.cacr.math.uwaterloo.ca/hac/.

Figure 1:
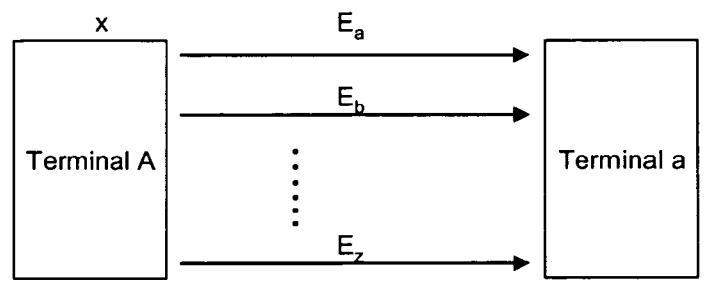
FIG. 1 shows an exemplary system with two terminals utilizing anonymous public keys cryptosystem according to this invention, wherein one of the terminals may reveal a different public key for a new communication session with the other terminal.

Communication systems in accordance with this invention may have several terminals and several communication channels. FIG. 1 shows one embodiment of this invention in simplified block diagram. In FIG. 1, Terminal A is communicating with Terminal a for several sessions. There is at least one communication channel for Terminal A to send information to Terminal a. The sessions may use one or several communication channels. Terminal a may or may not use the same communication channel to send information to Terminal A. Over the communication channels, Terminal A reveals different public keys $E_a$ to $E_z$ to Terminal a for different communication sessions, but keeps its private key x secret. Terminal a is equivalent to Terminal A in terms of revealing several different public keys to Terminal A if Terminal a needs to do so.

As can be seen in FIG. 1, by generating different public keys for different sessions, it would be virtually impossible for Terminal a, or any third party, to be able to correlate Terminal A's pattern of activities. For example, in an e-auction setting, the user from Terminal A would be able to prevent others from correlating and analyzing its bidding pattern and strategy, since a different public key is generated for each session.

Figure 2:
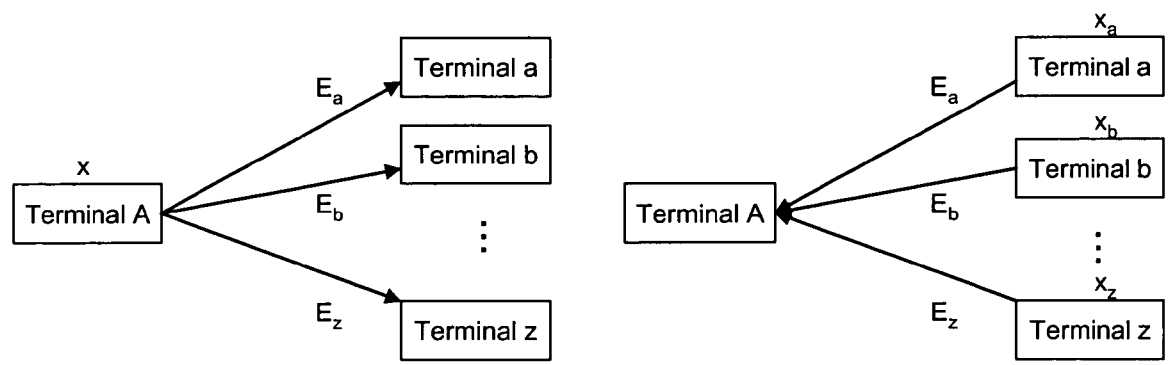
FIG. 2 shows an exemplary system with several terminals utilizing anonymous public keys cryptosystem according to this invention, wherein one terminal may communicate with the other terminals with different public keys used for different communications.

FIG. 2 also shows another embodiment of this invention in simplified block diagram. In FIG. 2, Terminal A is communicating with multiple terminals, from Terminal a to Terminal z. The communication channels in use between Terminal A and each of its correspondents may or may not be the same. As shown in the left half of FIG. 2, over the communication channels, Terminal A reveals different public keys $E_a$ to $E_z$, among other things, to Terminal a, Terminal b, . . . Terminal z, respectively. In this case, we assume there exists a "one-to-many" relationship between Terminal A and Terminal a to z. Said revelation can be accomplished in various ways. For example, there may be other information that is also revealed together with the public keys, or the public keys may be incorporated in an email or certificate. In return, Terminal a to Terminal z may or may not use the same communication channel, over which each of them receives a public key of Terminal A, to send information, which is encrypted with the public keys that have been received, to Terminal A. As before, Terminal A keeps its private key x secret. Similarly, Terminal a to Terminal z are equivalent to Terminal A in terms of revealing several different public keys to Terminal A if Terminal a to Terminal z need to do so, respectively. Similarly, from the right half of FIG. 2, Terminal a to z reveals their respective own public keys $E_a$ to $E_z$ to Terminal A. In this case, we assume there exists a "many-to-one" relationship between Terminal a to z and Terminal A.

Figure 3:
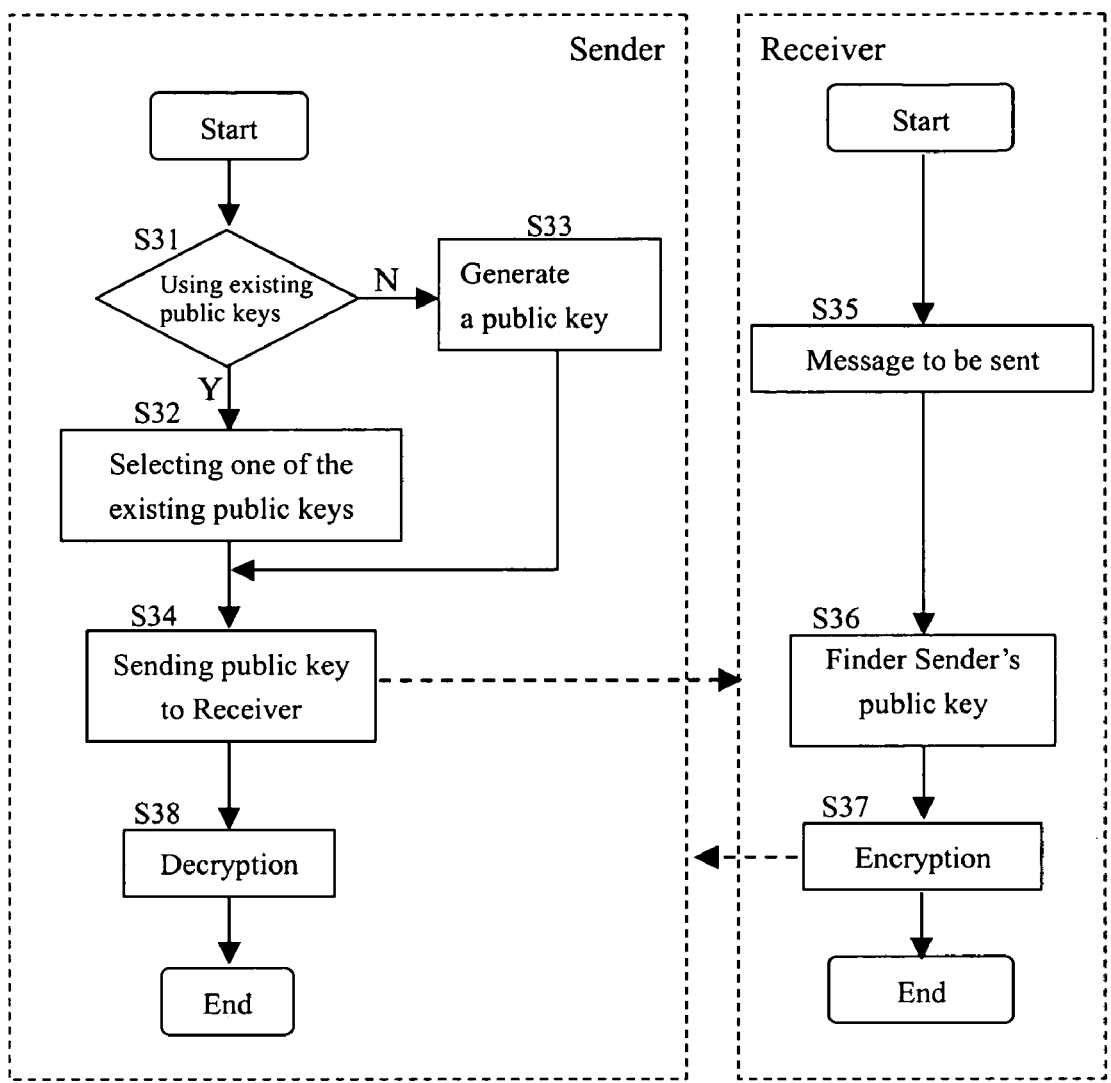
FIG. 3 shows an exemplary communication session between the Sender and the Receiver participating in the communication system illustrated in FIG. 1 and FIG. 2.

FIG. 3 shows an exemplary communication session between the Sender and the Receiver participating in the communication system illustrated in FIG. 1 and FIG. 2. In FIG. 3, each time the Sender would like to disclose a public key to the Receiver, the Sender decides (step S31) to either select one from its pool of existing public keys (step S32) or generate a new public key (step S33). Then the Sender sends the public key to the Receiver (step S34). Whenever there is message to send (step S35), the Receiver finds the Sender's public key (step S36) to encrypt the message (step S37) and then sends the encrypted message to the Sender. Finally, the Sender decrypts the received encrypted message (step S38) and recovers the original message sent from the Receiver. Note that the Receiver may have received the public key from the Sender long ago before it wants to send encrypted message to the Sender.

It should be pointed out that the Sender may be designed in such a way that it always generates a different public key (Step S33), without relying on any existing keys. However, as can be appreciated by those skilled in the art, the use of an existing pool of public keys will significantly reduce the computation overhead, since manipulation of the existing keys is inherently less computation-intensive than computing from scratch.

It should also be pointed out that the Sender and Receiver in FIG. 3 are only designated this way for convenience sake, since the Sender is the first to send its public key to the Receiver. Once the Receiver has the public key from the Sender, the Receiver actually becomes a sender when it sends the encrypted message to its receiver, the Sender. In a typical bilateral communication session between two terminals, the roles are frequently reversed throughout the session.

Figure 4:
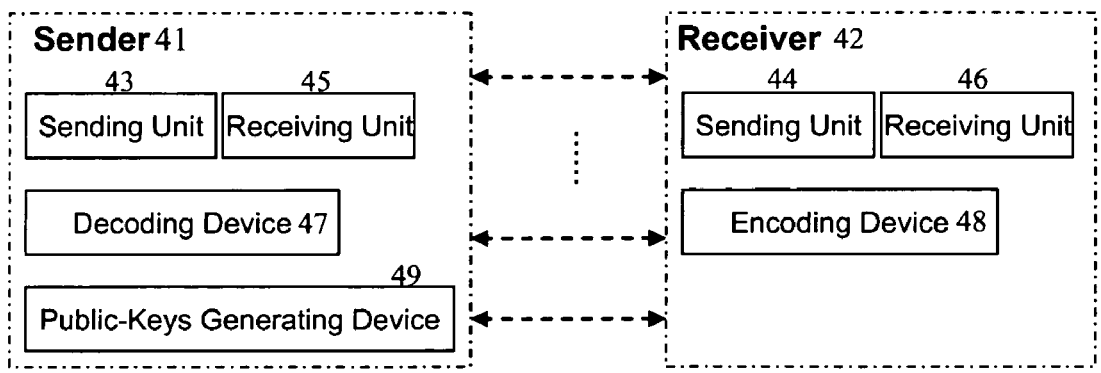
FIG. 4 shows the exemplary functional blocks of the Sender and Receiver in a communication session based on public-private key pairs in accordance with the present invention.

Now reference is turned to FIG. 4, which shows the exemplary functional blocks of the Sender and Receiver in a communication session based on public-private key pairs in accordance with the present invention. Here, the Sender 41 comprises, at least, a Sending Unit 43 and Receiving Unit 45 which deal with the communication channel, a Decoding Device 47 which handles decryption of cipher texts, and a Public Keys Generating Device 49 which handles public keys generating. The Receiver 42 comprises, at least, a Sending Unit 44, a Receiving Unit 46 and an Encoding Device 48 for handling encryption of information to be transmitted such as plain texts. The Sender 41 may disclose multiple public-keys to the Receiver 42, such that if there are multiple sessions between the Sender 41 and the Receiver 42, each session may use a different public key of the Sender 41. In case the Sender 41 also acts as a receiver, it may further comprise an Encoding Device 48. Similarly, and in case the Receiver 42 acts as a sender, it may further comprise a Decoding Device 47 and a Public Keys Generating Device 49.

Figure 5:
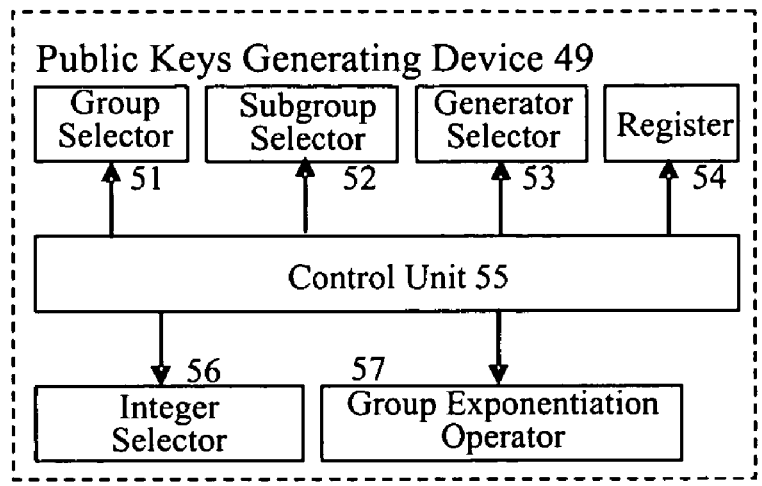
FIG. 5 shows the exemplary functional blocks of the Public Keys Generating Device in FIG. 4 in accordance with the present invention.

The Encoding Device 48 and the Decoding Device 47 in FIG. 4 are both well known in the field of data communication and encryption. The Public Keys Generating Device 49 is further elaborated in FIG. 5 below. Referring to FIG. 5, the Control Unit 55 handles the process of generating public keys as well as the duty of managing the keys. The Register 54 may be utilized to store the private key, pubic keys generated, public keys received and other data required by the Control Unit 55. In addition, the Register 54 used herein can be implemented by any device that can store information, such as on-chip registers, ROM, and RAM. The Pubic Keys Generating Device 49 may share the Register 54 with the Decoding Device 47 to store cipher texts received and intermediate output in the decryption. Other components of the Public Keys Generating Device 49 will be described later.

Note that in FIG. 5, the "group" operation is handled by the Group Exponentiation Operator 57. There may have other embodiments of the Public Keys Generating Device 49 where the group operation is handled by a separate Group Operator.

Next, description will be made to the process of the Public Keys Generating Device 49 of FIG. 4 and FIG. 5 for generating anonymous public keys ("APK") according to the present invention.

Figure 6:
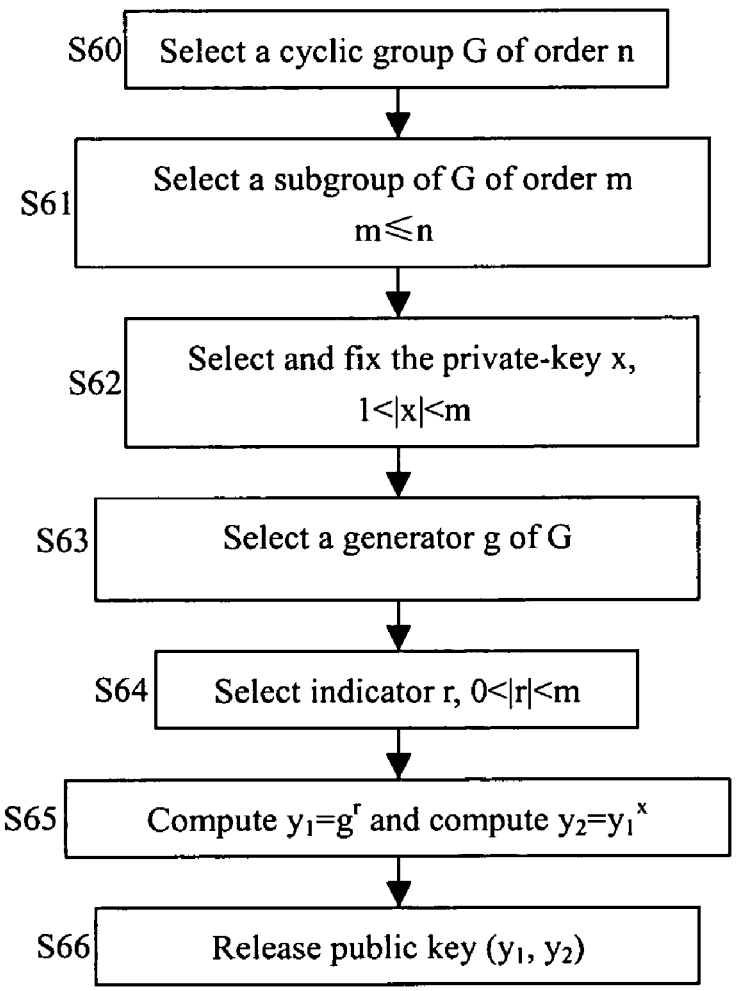
FIG. 6 shows an exemplary process flow of generating anonymous public keys according to the present invention.

FIG. 6 shows the exemplary process flow for generating APK/private key pairs. First, a group G is selected by the Group Selector 51 (Step S60). For example, a computer may have memory in which various data structures representing various eligible groups are stored. Under the control of the Control Unit 55, the Group Selector 51 selects one group by selecting the data structure representing the group. In actual practice, there are already some commercial function libraries that can run on the computer and provide such services. An application program that intends to implement the present invention may call, with some specific parameters, a particular function provided by such libraries. And then the called function can return the desired group(s). In one embodiment, G is a finite cyclic group and its order is n, which is a positive integer. Candidates of the finite cyclic group G include but is not limited to:

a group of points on an elliptic curve over a finite field $F_{q1}$;

a multiplicative group $F_{q2}*$ of a finite field $F_{q2}$, where $q2=p^{m1}$, m1 is a positive integer and p is a prime;

the group of $Z_{n1}*$, where n1 is a composite integer; and a multiplicative group of $Z_{n2}*$, where n2 is a prime.

Among the above four exemplary kinds of groups, the first group may have the best security performance, while the latter three are more commonly used in the art. The "finite cyclic" nature of group G guarantees that the result of group exponentiation operation will eventually be mapped into group G; however the mapping methods may vary from group to group. Besides, it also guarantees the existence of a generator.

Then, the Subgroup Selector 52 selects a subgroup of G of order m, where m≦n (Step S61). If m is selected as a prime, it will have the preferred security performance. Please note that the subgroup can be selected as G itself, which also means m=n. As in an alternative embodiment, on the premise that after the group G is determined or selected, the selection of the subgroup can be omitted, which also means G itself is implicitly selected as the subgroup, since G is a subgroup of itself mathematically. That is also to say, when G itself is selected as the subgroup, which causes m=n, such a selection is seemingly dismissed. Of course, if the selection of the subgroup is omitted, the Subgroup Selector 52 (as described in FIG. 5) can also be omitted.

Then, the Integer Selector 56 selects an integer as the private key x, such that x satisfies 1<|x|<m (Step S62). It is to be understood that one terminal may have a plurality of private keys, although the description herein is focused on how to generate a plurality of public keys from one private key, for the sake of simplicity.

Then, the Generator Selector 53 selects and fixes a generator g of group G (Step S63). If G is a finite cyclic group, it always has at least one generator. It is to be noted that the selections of g and x are independent from each other. That is to say, although Step S62 is described prior to Step S63 here, the order of their performance can be reversed or they can be performed in parallel.

After the selection of G, m, x and g, an integer r is selected as the indicator that satisfies $0<|r|<m$ to generate a new public key under the control of the Control Unit 55 (Step S64).

With the selection of G, m, x, g and r, a new public key is generated with the computation of $y_1=g^r$ and then $y_2=y_1^x$ (Step S65). Then the public key $(y_1,y_2)$ can be released (Step S66) to the Receiver for encryption. Of course, there may be other information that is also released together with the public key.

It is to be noted that the selection of g, x, and r has no sequential and dependency requirement between their selections, such that Steps S62, S63, S64 can be performed in any order, sequentially or concurrently. In addition, the selection of g, x and r may be at random or in accordance with some criteria as desired.

Alternately, some of the aforementioned procedures may be omitted by the Control Unit 55, but performed elsewhere. For example, the group G and the subgroup can be assigned by a third party such as an entrust organization. Hence the Control Unit 55 skips steps of selecting the group and subgroup, since they are now determined externally. Further, if one anonymous public key has been previously generated, it is for certain that the group, subgroup, generator and private key all have been selected and fixed. Therefore when a new public key is to be generated, the Control Unit 55 skips these four steps and goes directly to the following steps.

If $y_1$ or $y_2$ is originally outside the range of group G, they must be mapped into group G. The mapping methods may vary for different groups. However, the cyclic group G guarantees the existence of such mapping method.

It is to be noted that the foregoing steps may be performed either in one single device/module (with integrated or discrete components) of a system, or in a distributed manner with respective devices of the system performing some of the steps, respectively.

Example of Selecting Group, Subgroup and Generator

An example of the group, subgroup and generator selection is described below. Suppose group $Z_p^*$ is selected where p=11, hence $Z_{11}^*=\{1, 2, 3, 4, 5, 6, 7, 8, 9, 10\}$. Since 11 is a prime, mathematically the order of $Z_{11}^*$ is 11−1=10. The element 2 is a generator of $Z_{11}^*$ as can be easily verified that $Z_{11}^*=\{2^i \bmod 11/i=0,1,\ldots,9\}$. Since a group is also a subgroup of itself, the subgroup may be chosen as $Z_{11}^*$. Another choice of subgroup for example is $\{1, 3, 4, 5, 9\}$ which has the generator 3 of order 5. Again it's easy to verify that $3^5=1 \bmod 11$.

Furthermore, as can be appreciated by those skilled in the art all of the devices and components can be implemented in hardware, software, firmware or the combination thereof depending upon various considerations.

Optimization of Key Generation

Figure 7:
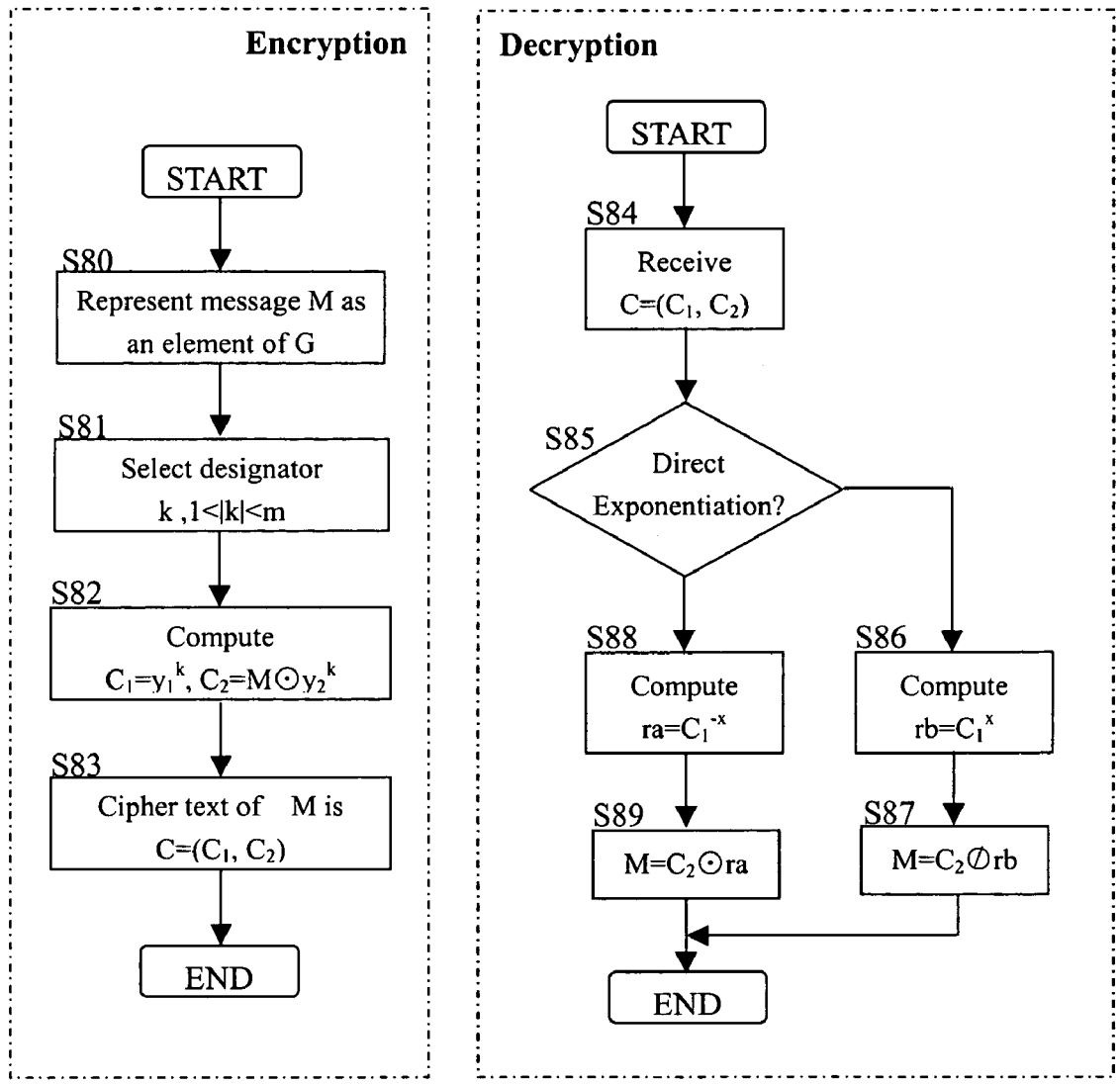
FIG. 7 shows the exemplary procedures of encryption and decryption of a message.

The exemplary method primarily described in FIG. 6 is only one of the numerous methods available for generating anonymous public keys according to the present invention. There are more advanced methods that not only can be used for the same purpose, but also can achieve optimization in performance. To describe the optimization methods, the encoding and decoding procedures well known in the art are briefly summarized with reference to FIGS. 4, 5 and 7, wherein ⊙ is a group G invertible operation and Ø is the exact inverse operation of ⊙. The present invention has been applied in the procedures in FIG. 7.

To encrypt a plain text M, M is first represented as an element of G (for example, M is represented as its ASCII code) (Step S80), then an integer k is selected as the designator satisfying $1<|k|<m$ (Step S81) and a pair of values are computed as follows (Step S82)

$C_1=y_1^k$, and $C_2=M\odot y_2^k$, where $C_1$ and $C_2$ are group G members. All of these operations can be done by the Encoding Device 48 in FIG. 4. Examples of ⊙ can be multiplication, division, addition or subtraction of group G. If $C_1$ or $C_2$ is originally outside the range of group G, they must be mapped into group G. The mapping methods may vary for different groups.

At this time, the cipher text of the message M is obtained as $C=(C_1, C_2)$ (Step S83) and it can be sent out over a communication channel by the Sending Unit 44.

For a message M that is outside the range of group G to be encoded, it must be transformed into several group members before encoding. Following subsequent decoding, the recovered group members may be transformed back to the original message. The transformation methods may vary for different groups. One example is breaking the message into several blocks, each of which is a member of group G, and concatenating all the blocks to reconstruct M.

At the other side of the communication channel, the ciphertext message C is received (Step S84). To retrieve the plain text M from the cipher text C, first it has to be decided between two ways, direct exponentiation or not (Step S85). If yes, $rb=C_1^x$ is first computed (Step S86) and then M is obtained by computing $M=C_2 \emptyset rb$ (Step S87); otherwise, $ra=C_1^{-x}$ is first computed (Step S88) and then M is obtained by computing $M=C_2 \odot ra$ (Step S89).

After successful decryption of a cipher text $(C_1, C_2)$, depending on the implementation of decryption, the Public Keys Generating Device 49, in accordance with the present invention, may make use of the received cipher text as well as the intermediate decryption output ra to generate a new anonymous public key in the form of $(y_1=C_1^{-1}, y_2=ra)$. Similarly, the Public Keys Generating Device 49 may make use of the received cipher text as well as the intermediate decryption output rb to generate a new anonymous public key in the form of $(y_1=C_1, y_2=rb)$. In either way of generating a new anonymous public key, the exponentiation operation is avoided and computation efficiency is enhanced.

Furthermore, when a single anonymous public key $(y_1, y_2)$ is provided, the Public Keys Generating Device 49 may generate a new anonymous public key in the form of $(y_2, y_2^x)$. This method can be utilized multiple times to generate a chain of public keys. This way, storage consumption of the public keys generated are heavily reduced since the second portion of the public key, $y_2$, is identical to the first portion of its following. For a chain of w public keys, up to $(w-1)/2w$ percentage of storage are saved which implies approximate 50% saving for w large enough.

In this invention, since the public keys are generated with the same generator based on the form of powers of the generator, the powers of the generator g can be reused to generate a series of public keys, which involves multiplication, instead of exponentiation, thus saving the memory storage and accelerating the computation. Meanwhile, since only one table of the powers of the generator needs to be maintained in the decoding device, the computation of new public keys can be performed off-line.

For example, in an embodiment, when a cipher text message $C=(C_1,C_2)$ is received in the decoding device, C1 can be retrieved and utilized to generate new public keys. As described, $C_1=y_1^k=g^{rk}$, and $g^{rk}$ can be saved to generate new public keys because the product "rk" is only another integer. It is to be noted that although $g^{rk}$ can be saved to generate new public keys, the value of rk may still be unknown to the decoding device, unless the encoding device revealed k when sending the encrypted message.

When a single anonymous public key $(y_1, y_2)$ is provided, the Public Keys Generating Device 49 may generate a new anonymous public key in the form of $(y_1 \times y_1, y_2 \times y_2)$, where × is group multiplication. In general, if there are provided several anonymous public keys $(y_{11}, y_{21}), (y_{12}, y_{22}), \ldots, (y_{1j}, y_{2j})$, $j \geq 2$, based on the plurality of stored powers of g, $y_{11}=g^{r1}, y_{12}=g^{r2}, \ldots, y_{1j}=g^{rj}$, and $y_{21}=y_{11}{}^x, y_{22}=y_{12}{}^x, \ldots, y_{2j}=y_{1j}{}^x$, a new public key can be computed as $(y_{1(j+1)}=y_{11} y_{12} \ldots y_{1j}, y_{2(j+1)}=y_{21}y_{22} \ldots y_{2j})$, where $y_{11}y_{12} \ldots y_{1j}$ is the product of $y_{11}, y_{12}, \ldots, y_{1j}, y_{21}y_{22} \ldots y_{2j}$ is the product of $y_{21}, y_{22}, \ldots, y_{2j}$. Clearly, to generate a new anonymous public key, the exponentiation operation is replaced by multiplication and computation efficiency is enhanced. Since multiplication can be carried out online, new public keys generated in this way may not need to be pre-computed, which directly implies saving of storage space.

The above optimization techniques may be jointly used to generate new anonymous public keys. For instance, upon receiving and after successful decryption of a series of cipher texts $(C_{11}, C_{21}), (C_{12}, C_{22}) \ldots (C_{1j}, C_{2j}), j \geq 2$, the Public Keys Generating Device 49 can make use of the received cipher texts as well as the intermediate decryption outputs $rb_1, rb_2, \ldots, rb_j$ to generate a new anonymous public key in the form of $(y_1=(C_{11}C_{12} \ldots C_{1j}), y_2=(rb_1 rb_2 \ldots rb_j))$, where $C_{11}C_{12} \ldots C_{1j}$ is the product of $C_{11}, C_{12}, \ldots, C_{1j}, rb_1 rb_2 \ldots rb_j$ is the product of $rb_1, rb_2, \ldots, rb_j$.

Furthermore, with the computation of $y_2$, a series of public keys can be computed as $(y_2{}^{w1}, y_2{}^{w2})$, where $w_1=x^w$, $w_2=x^{(w+1)}$, $w \geq 0$. Furthermore, all of the results, specifically the powers of g, obtained in this computation can be utilized to generate further public keys.

Furthermore, based on $C_1$ retrieved from the cipher-text message C, the decoding device can generate more new public keys. For this purpose, $C_1{}^x$ and $C_1{}^{-x}$ can be computed and saved, and then two series of public keys can be generated. In general, when a plurality of encrypted messages $CC_1=(C_{11}, C_{12}), CC_2=(C_{21},C_{22}), \ldots, CC_j=(C_{j1},C_{j2})$ are received, for the case of $C_1{}^x$, a series of new public keys can be generated as $((C_{11}C_{21} \ldots C_{j1})^{u1}, (C_{11}C_{21} \ldots C_{j1})^{u2})$, where $C_{11}C_{21} \ldots C_{j1}$ is the product of $C_{11}, C_{21}, \ldots, C_{j1}, j \geq 1, u1=x^u, u2=x^{(u+1)}$ and $u \geq 0$, and for the case of $C_1{}^{-x}$, another series of new public keys can be generated as $((C_{11}C_{21} \ldots C_{j1})^{v1}, (C_{11}C_{12} \ldots C_{j1})^{v2})$, where $C_{11}C_{21} \ldots C_{j1}$ is the product of $C_{11}, C_{21}, \ldots, C_{j1}, j \geq 1, v1=-x^v, v2=-x^{(v+1)}$ and $v \geq 0$. Furthermore, all of the results, specifically the powers of g, obtained in this computation can be utilized to generate further public keys.

Anonymous Private Keys

In some cases, the user may wish to select several private keys and generate several series of anonymous public keys for different private keys, respectively. The user can select several private keys $x_i$, and generate anonymous public keys for each $x_i$ as $(g^a, g^{axi})$. Since the one-private-key-to-one-public-key model is displaced by the teaching of the present invention, the anonymity of anonymous public keys implies anonymity of said several private keys. In this sense, this invention also achieves anonymous private key.

Illustration of a Secure Communication Session

We now illustrate a secure communication system embodiment in accordance with this invention, where anonymous public keys technique is based on cyclic group $Z_p{}^*$. For the sake of simplicity, $p=11$, hence $Z_{11}{}^*=\{1, 2, 3, 4, 5, 6, 7, 8, 9, 10\}$. The order of $Z_{11}{}^*$ is 10. The subgroup is chosen as $Z_{11}{}^*$. The generator is 2.

At the decoding side, the private key is selected as $x=3$. If the integer $a=4$ is selected as the indicator, the Public Keys Generating Device 49 generates an anonymous public key $(2^4=5, 5^3=4)$ mod 11. For another integer $a=7$, the Public Keys Generating Device 49 generates another anonymous public key $(2^7=7, 7^3=2)$ mod 11.

Suppose these two anonymous public keys are delivered to two receivers. Receiver A that receives public key (5, 4) has plain text 8 to encrypt. Another receiver, Receiver B has plaintext 10 to encrypt.

Receiver A selects integer 6 as the designator and computes the cipher text of 8 as $(5^6=5, 8 \times 4^6=10)$ mod 11. Similarly, Receiver B selects integer 3 and compute the cipher text of 10 as $(7^3=2, 10 \times 2^3=3)$ mod 11.

The cipher text (5, 10) and (2, 3) are passed to the decoding side, respectively. The plaintext of (5, 10) may be computed according to $5^{-3}=5^{10} \times 5^{-3}=5^7=3$ mod 11 and $10 \times 3=8$ mod 11. The plain text of (4, 7) may be computed according to $2^3 32\ 8$ mod 11, and $3/8=3 \times 8^{-1}=3 \times 8^{10} \times 8^{-1}=3 \times 8^9=10$ mod 11.

Thus, plaintext 8 and 10 are successfully retrieved at the decoding side. Further, optimization techniques can be utilized to generate new anonymous public keys.

Based on the cipher text (2, 3) and intermediate decoding output 8, an anonymous public key may be generated as (2, 8).

Based on the cipher text (5, 10) and intermediate decoding output 3, an anonymous public key may be generated as $(5^{-1}=9, 3)$ mod 11.

Based on one of the anonymous public keys (2, 8), a series of public keys may be generated as $(2, 8), (8, 8^3=6), (6, 6^3=7)$ mod 11.

Based on one of the anonymous public keys (9, 3), a new public key may be generated as $(9 \times 9=4, 3 \times 3=9)$ mod 11.

Based on some of the anonymous public keys, such as (2, 8), (7, 2), a new public key may be generated as $(2 \times 7=3, 8 \times 2=5)$ mod 11.

As can be seen from the above description, parameters from various senders are utilized to generate new public keys. Therefore, the privacy level of the resultant public keys can be improved. It is to be noted that all of the public keys are generated based on one single private key x and the same generator g.

Aspects of the invention can be implemented in computer executable instructions contained in computer readable medium, and it can also be implemented in hard-wired logic/circuitry or combination of hardware and software. Furthermore, the devices involved in the specification may also include memory, such as RAM, DRAM and ROM, to store necessary data and computer executable instructions to perform the steps taught in this invention. And such memory can also be incorporated in the encoding device and/or the decoding device of the terminal. Such use of the memory is well known in the art, so it is not described here or illustrated in the accompanying drawings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method of generating public keys for encrypting messages to be transmitted, comprising:

selecting a private key x;

generating, using a computer processor, a public key using said private key and an generator g, said private key and said generator being from a predetermined group G; and releasing said public key before or at the beginning of a communication session, wherein multiple public keys are generated using said private key and said generator for multiple communication sessions, said generating said public key comprises computing $y_1=g^r$ and $Y_2=Y_1^x$, wherein r is an integer.

2. The method of claim 1, wherein said step of generating further comprises:

selecting said predetermined group G of a predetermined order;

selecting the private key based on said order;

selecting a member g of group G as the generator;

selecting an integer r as an indicator within said order; and computing said public key based on said private key, said generator and said indicator.

3. The method of claim 2, wherein said step of generating further comprises:

selecting a subgroup of said group G of equal or less order, and wherein the private key and the indicator is within the order of the subgroup.

4. The method of claim 3, wherein the order of the group G is an positive integer n;

the order of the subgroup of G is m where m<n;

the private key x satisfies $1<|x|<m$;

the generator g is an element of G;

the indicator r satisfies $0<|r|<m$;

and when a new indicator is selected, a new public key is generated.

5. The method of claim 4, further comprising:

computing a series of public keys based on $y_2$.

6. The method of claim 2, further comprising:

storing powers of said generator g; and computing new public keys based on said stored powers of said generator g.

7. The method of claim 6, further comprising:

using said stored powers of said generator to compute a new public key as the product of said stored powers.

8. The method of generating public keys for encrypting messages to be transmitted accordingly to claim 1, wherein a sender selects the private key and generates the multiple public keys.

9. A computing device for generating a plurality of public keys, comprising:

a group selector for selecting a group of a predetermined order;

a register for storing information generated or selected;

an integer selector for selecting a private key x and an integer r as an indicator based on said order;

a generator selector for selecting a generator g from said group;

a group operator for performing group operation of said group;

a generating module for generating the plurality of public keys from said private key with said generator; and a control unit for controlling operations of said group selector, said register, said integer selector, said group operator and said generating module, wherein said generating module computes a public key ($y_1$, $y_2$) by computing $y_1=g^r$ and $Y_{2=y1}^x$.

10. The device of claim 9, further comprising:

a subgroup selector for selecting a subgroup of said group G whose order is m and m equals to or is less than the order of said group, wherein the private key x and the indicator r satisfy $1<|x|<m$ and $0<|r|<m$ respectively, and wherein when a new indicator is selected, a new public key is generated.

11. The device of claim 10, wherein the register further stores powers of the generator, which are used in generating new public keys by said generating module.

12. The device of claim 11, wherein, based on a plurality of stored powers, a new public key is computed as the product of the stored powers.

13. The device of claim 9, wherein any of said control unit, group selector, register, integer selector, group operator and generating module is implemented in software, hardware or the combination of software and hardware.

14. A communication method, comprising:

selecting a private key x;

generating, using a computer processor, a public key using said private key x and an generator g, said private key and said generator being from a predetermined group G;

releasing the public key;

encrypting a message M with the public key to obtain an encrypted message C;

sending the encrypted message C over a communication channel;

receiving the encrypted message C on the communication channel; and decrypting the encrypted message C with the private key to recover the message M, wherein multiple different public keys are generated using said private key and said generator for multiple different communication sessions, said generating said public key comprises computing $y_1=g^r$ and $y_2=y_1^x$, wherein r is an integer.

15. The method of claim 14, further comprising:

selecting a subgroup of said group G of equal or less order, wherein the public keys are generated based on the subgroup.

16. The method of claim 15, wherein the order of the group G is an positive integer n;

the order of the subgroup of G is an positive integer m where m<n;

the private key x satisfies $1<|x|<m$;

the generator g is an element of G;

an indicator r is selected as satisfies $0<|r|<m$; and said public key is computed as ($y_1$, $y_2$) *, wherein when a different indicator is selected, a different public key is generated.

17. The method of claim 16, wherein the encrypted message is computed from the message M by:

selecting an integer k as an designator satisfying $1<|k|<m$; and computing the encrypted message C by computing $C=(C_1, C_2)$ where $C_1=y_1^k$ and $C_2=M\odot y_2^k$, and wherein when the encrypted message is received, $C_1$ is retrieved from the message and utilized to generate new public keys.

18. The method of claim 17, wherein when a plurality of encrypted messages are received, a series of new public keys are generated based on the product of portions of the received encrypted messages.

19. A communication system comprising:

one or more encoding devices;

a decoding device has a private key x; and one or more communication channels over which the encoding devices communicate with the decoding device, wherein when a new communication session is started over one of the channels, the decoding device generates a new public key from the private key with the same generator g of a group, wherein said public key is generated by computing $y_1 = g^r$ and $y_2 = y_1^x$, p1 wherein r is an integer.

20. The system of claim 19, wherein the decoding device stores powers of said generator which are used in computing new public keys.

21. The system of claim 20, wherein when the encrypted message is received in the decoding device, it is utilized to generate new public keys.

22. A manufacturing article having a non-transitory machine readable medium with instructions recorded thereon which, when executed by one or more processors, causes the processors to select a private key x;

generate a public key using said private key and an generator g, said private key and said generator being from a predetermined group; and release said public key before or at the beginning of said communication session, wherein multiple public keys are generated using said private key and said generator for multiple communication sessions, said generating said public key comprises computing $y_1 = g^r$ and $y_2 = y_1^x$, wherein r is an integer.

23. A manufacturing article having a non-transitory machine readable medium with instructions recorded thereon which, when executed by a processor, cause the processor to select a private key x;

generate a public key using said private key and an generator g, said private key and said generator being from a predetermined group;

release the public key;

encrypt a message with the public key;

send the encrypted message over a communication channel;

receive the encrypted message on the communication channel; and decode the encrypted message with the private key to recover the message, wherein multiple different public keys are generated using said private key and said generator for multiple different communication sessions, said generating said public key comprises computing $y_1 = g^r$ and $y_2 = y_1^x$, wherein r is an integer.

* * * * *

UNITED STATES PATENT AND TRADEMARK OFFICE
CERTIFICATE OF CORRECTION

PATENT NO. : 7,873,169 B2  
APPLICATION NO. : 11/269774  
DATED : January 18, 2011  
INVENTOR(S) : Ke Zeng and Tomoyuki Fujita Page 1 of 1

It is certified that error appears in the above-identified patent and that said Letters Patent is hereby corrected as shown below:

In the Specifications

Column 2, Lines 8-9: Delete "dissertaion" and insert -- dissertation --

In the Claims

Column 13, Line 10: In Claim 1, delete "$Y_2=Y_1^x$," and insert -- $y_2=y_1^x$, --

Column 13, Line 29: In Claim 4, delete "$m<n$;" and insert -- $m \leq n$; --

Column 13, Line 67: In Claim 9, delete "$Y_{2=y_1}^x$." and insert -- $y_2=y_1^x$. --

Column 14, Line 46: In Claim 16, delete "$m<n$;" and insert -- $m \leq n$; --

Column 14, Line 50: In Claim 16, delete "$(y_1, y_2)$ *," and insert -- $(y_1, y_2)$, --

Column 15, Line 9: In Claim 19, delete "$y1=g^{r\ and\ y}{}_{2=y_1}^x$, p1" and insert -- $y_1=g^r$ and $y_2=y_1^x$, --

Column 16, Line 1: In Claim 22, delete "kev" and insert -- key --

Column 16, Line 2: In Claim 22, delete "$y_{2=y_1}^x$," and insert -- $y_2=y_1^x$, --

Signed and Sealed this  
Ninth Day of July, 2013

Teresa Stanek Rea  
*Acting Director of the United States Patent and Trademark Office*